United States Patent

(12) United States Patent
Fukuyo et al.

(10) Patent No.: US 11,698,783 B2
(45) Date of Patent: Jul. 11, 2023

(54) SERVER, SOFTWARE UPDATING DEVICE, VEHICLE, SOFTWARE UPDATING SYSTEM, CONTROL METHOD, AND NON-TRANSITORY STORAGE MEDIUM

(71) Applicant: TOYOTA JIDOSHA KABUSHIKI KAISHA, Toyota (JP)

(72) Inventors: Satoru Fukuyo, Nisshin (JP); Yusuke Satoh, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/366,196

(22) Filed: Jul. 2, 2021

(65) Prior Publication Data

US 2022/0027143 A1 Jan. 27, 2022

(30) Foreign Application Priority Data

Jul. 27, 2020 (JP) ................................. 2020-126799

(51) Int. Cl.
*G06F 8/65* (2018.01)
*H04L 67/12* (2022.01)

(52) U.S. Cl.
CPC ................ *G06F 8/65* (2013.01); *H04L 67/12* (2013.01)

(58) Field of Classification Search
CPC . G06F 8/65; G06F 8/654; G06F 8/656; H04L 67/12
See application file for complete search history.

(56) References Cited

U.S. PATENT DOCUMENTS

| | | | |
|---|---|---|---|
| 2012/0047498 A1* | 2/2012 | Motta | G06F 8/65 717/171 |
| 2015/0169311 A1* | 6/2015 | Dickerson | G06F 8/65 717/170 |
| 2017/0003949 A1* | 1/2017 | Gao | G06F 8/65 |
| 2018/0132193 A1* | 5/2018 | Misener | H04W 52/383 |
| 2019/0258467 A1* | 8/2019 | Frantz | G01C 21/3691 |
| 2020/0210167 A1 | 7/2020 | Ogawa et al. | |
| 2020/0348923 A1* | 11/2020 | Mezaael | H04W 4/44 |

FOREIGN PATENT DOCUMENTS

| | | |
|---|---|---|
| JP | 2011-148398 A | 8/2011 |
| WO | 2019/035261 A1 | 2/2019 |

* cited by examiner

*Primary Examiner* — S. Sough
*Assistant Examiner* — Chenega Smith
(74) *Attorney, Agent, or Firm* — Oliff PLC

(57) ABSTRACT

A server configured to transmit update data used in updating software of an in-vehicle device of a vehicle to the vehicle. The server includes: a communication module configured to receive usage information representing a usage state of the vehicle, and transmit the update data to the vehicle; and one or more processors configured to control, based on the usage information, at least one of a timing or a communication speed of transmitting the update data to the vehicle by the communication module.

7 Claims, 2 Drawing Sheets

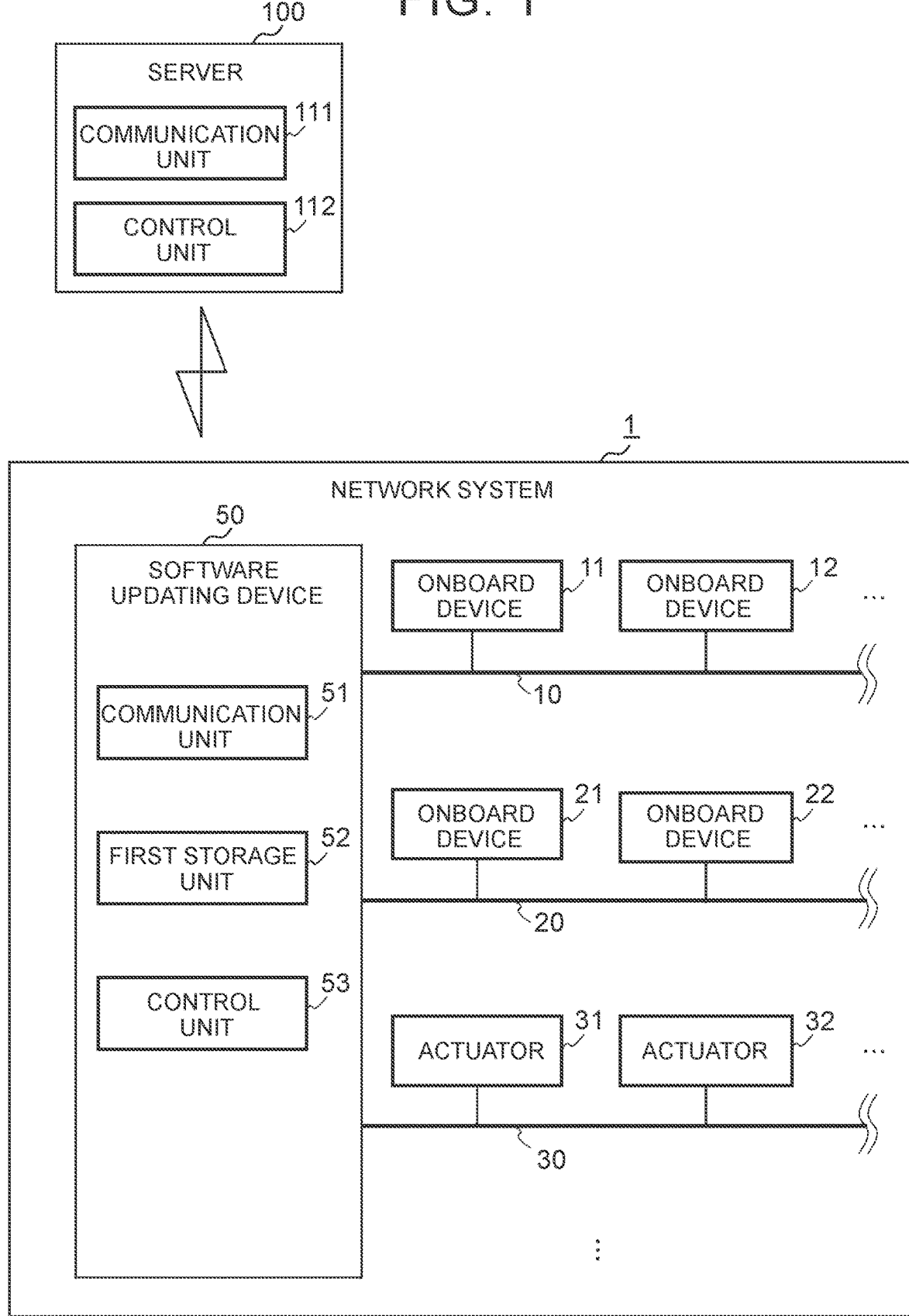

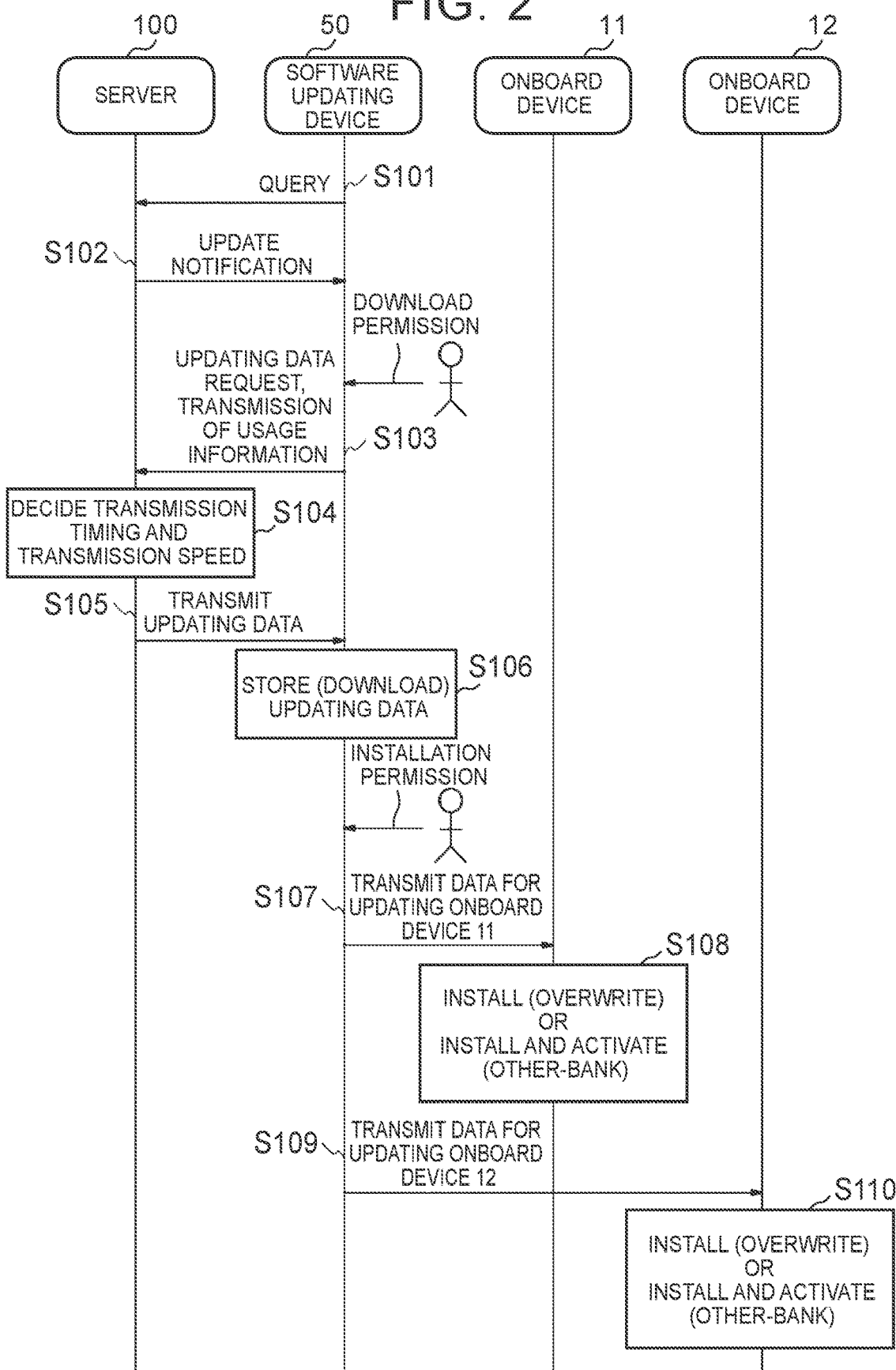

SERVER, SOFTWARE UPDATING DEVICE, VEHICLE, SOFTWARE UPDATING SYSTEM, CONTROL METHOD, AND NON-TRANSITORY STORAGE MEDIUM

CROSS-REFERENCE TO RELATED APPLICATION

This application claims priority to Japanese Patent Application No. 2020-126799 filed on Jul. 27, 2020, incorporated herein by reference in its entirety.

BACKGROUND

1. Technical Field

The present disclosure relates to a server, a software updating device, a vehicle, a software updating system, a control method, and a non-transitory storage medium.

2. Description of Related Art

A network system, configured of a plurality of in-vehicle devices called electronic control units (ECUs) connected to each other via communication lines, is installed in a vehicle. The in-vehicle devices exchange messages with each other to respectively undertake various functions of the vehicle.

The in-vehicle devices typically are provided with a processor, a transitory storage unit such as random access memory (RAM), and a nonvolatile storage unit such as flash read-only memory (ROM). Software that the processor executes (software) is stored in the nonvolatile storage unit. Updating the software by rewriting to a newer version enables functions of the in-vehicle devices to be improved and enhanced.

Updating of software includes steps of downloading, in which update data is received from a server (server, center) by wireless communication or the like, and installing, in which updating software is written to the storage units of the in-vehicle devices based on the downloaded update data. Installing includes overwrite installing and other-bank installing. The overwrite installing or the other-bank installing is executed in accordance with specifications of the in-vehicle device. The overwrite installing is installing in which downloaded updating software is overwritten over the current software (old software) in one region (single bank) set as a region for software storage in a storage region of a storage unit. The other-bank installing is installing executed in the in-vehicle device of which the storage includes two regions (two banks) set as regions for software storage. The two regions include a region in which the current software (old software) is stored (one bank) and a region that is not the region in which the current software is stored (other bank). The other-bank installing is installing in which writing is performed to the region (other bank) that is not the region in which the current software is stored. The two regions set as regions for software storage may be regions each included in different banks (configuration increments) of the same memory part, or may each be regions of different memory parts, for example.

When performing other-bank installing, the step of software updating includes, in addition to the steps of downloading and installing, a step of activating, in which setting values of the updating software, such as start address and so forth, are configured, so that the installed updating software is executable.

With regard to software updating of ECUs, Japanese Unexamined Patent Application Publication No. 2011-148398 (JP 2011-148398 A) discloses a particular ECU functioning as a master ECU, communicating with a server, and updating software of the master ECU itself and other ECUs.

SUMMARY

A server (center) that distributes update data for updating software is provided, and update data for updating software of in-vehicle devices installed in vehicles is distributed to each of a plurality of vehicles. Fast communication speed of the server is preferable in order to quickly update software, but uniformly increasing communication speed leads to problems of bandwidth overwhelming, increased loads, and so forth. Accordingly, good communication control is desired.

The present disclosure provides a server, a software updating device, a vehicle, a software updating system, a control method, and a non-transitory storage medium that can perform good communication of update data for software updating.

A server according to a first aspect of the present disclosure is configured to transmit update data used in updating software of an in-vehicle device of a vehicle to the vehicle. The server includes: a communication module configured to receive usage information representing a usage state of the vehicle, and transmit the update data to the vehicle; and one or more processors configured to control, based on the usage information, at least one of a timing or a communication speed of transmitting the update data to the vehicle by the communication module.

A software updating device according to a second aspect of the present disclosure is installed in a vehicle. The software updating device includes: a one or more processors configured to acquire or generate usage information representing a usage state of the vehicle; and a communication module configured to transmit the usage information to a server, and receive, from the server, update data used in updating software of an in-vehicle device of the vehicle, at a timing and a communication speed of which at least one is set based on the usage information.

A vehicle according to a third aspect of the present disclosure includes the software updating device according to the second aspect.

A software updating system according to a fourth aspect of the present disclosure includes a software updating device configured to transmit usage information representing a usage state of a vehicle; and a server configured to receive the usage information from the software updating device, control, based on the usage information, at least one of a timing or a communication speed of transmitting update data used in updating software of an in-vehicle device of the vehicle, and transmit the update data to the software updating device.

A control method according to a fifth aspect of the present disclosure is executed by a computer of a server configured to transmit update data used in updating software of an in-vehicle device of a vehicle to the vehicle. The control method includes: receiving usage information representing a usage state of the vehicle; and controlling, based on the usage information, at least one of a timing and a communication speed of transmitting the update data, to transmit the update data to the vehicle.

A non-transitory storage medium according to a sixth aspect of the present disclosure stores a control program that is executable by the computer of the server configured to transmit, to the vehicle, the update data used in updating the software of the in-vehicle device of the vehicle and that causes the computer to perform the control method according to the fifth aspect.

According to the present disclosure, at least one of the timing and the communication speed of transmitting update data for updating software is controlled in accordance with the usage state of the vehicle, and accordingly delay of updating software can be suppressed while suppressing bandwidth overwhelming and increased loads more readily than uniformly increasing communication speed. Thus, according to the server, the software updating device, the vehicle, the software updating system, the control method, and the non-transitory storage medium of the present disclosure, the good communication of update data for updating software can be performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a configuration diagram of a network system according to an embodiment; and FIG. 2 is a sequence diagram illustrating processing according to the embodiment.

DETAILED DESCRIPTION OF EMBODIMENTS

Configuration

FIG. 1 illustrates a configuration example of a network system 1 according to an embodiment. The network system 1 is installed in a vehicle. The network system 1 includes a software updating device 50. A plurality of busses 10, 20, 30 . . . are connected to the software updating device (over-the-air (OTA) master) 50. A plurality of in-vehicle devices (electronic control units (ECUs)) 11, 12 . . . is connected to the bus 10. A plurality of in-vehicle devices 21, 22 . . . is connected to the bus 20. A plurality of actuators 31, 32 . . . is connected to the bus 30. Although in FIG. 1 and the following description, the busses 10, 20, and 30 are exemplified as busses, and the in-vehicle devices 11, 12, 21, and 22 and the actuators 31 and 32 are exemplified as in-vehicle devices, the number thereof are not limiting. Note that various types of sensors for acquiring the state of the vehicle and the surroundings of the vehicle are connected to the busses 10, 20, and 30, and the in-vehicle devices 11, 12, 21, and 22 as appropriate.

The software updating device 50 includes a communication unit (communication module) 51 capable of communicating with a server (center, external device) 100 that is installed outside of the vehicle, a first storage unit (storage) 52 that stores various types of data, and a control unit 53.

The in-vehicle devices 11, 12, 21, and 22 communicate with each other via a network, and perform various types of processing for vehicle control. Although omitted from illustration, these in-vehicle devices include a nonvolatile second storage unit (storage) such as flash read-only memory (ROM) or the like, a control unit (processor, microcontroller) that reads software out from the second storage unit and executes the software, thereby performing various types of processing, and a transitory storage unit such as random access memory (RAM) that stores part of software and data. Note that the software updating device 50 also stores software (program) for the software updating device 50 in the first storage unit 52 in the same way, and is capable of executing the functions of the software updating device 50 by the control unit (processor, microcontroller) 53 reading out and executing the software. That is to say, the in-vehicle devices 11, 12, 21, and 22 and the software updating device 50 can be implemented as computers including one or more processors, one or more microcontrollers, or the like.

Also, the control unit 53 of the software updating device 50 controls and relays communication between the server 100 and the in-vehicle devices 11, 12, 21, and 22, communication among the in-vehicle devices 11, 12, 21, and 22, and communication between the in-vehicle devices 11, 12, 21, and 22 and the actuators 31 and 32, over the busses 10, 20, and 30. Thus, the software updating device 50 also functions as a relay device that relays communication. Alternatively, the software updating device 50 may be provided as a part of such a relay device, or may be connected to one of the busses 10, 20, and 30 separately from such a relay device.

The actuators 31 and 32 are devices that generate mechanical actions with regard to the vehicle and parts thereof, such as brakes, engine, power steering device, and so forth, and operate under instructions from the in-vehicle devices 11, 12, 21, and 22.

The control unit 53 of the software updating device 50 is capable of updating software stored in the second storage unit of each of the in-vehicle devices 11, 12, 21, and 22. That is to say, the software updating device 50 performs control of downloading, control of installing, and further control of activating. Downloading is processing of receiving and storing update data (distribution package) for updating software of one of the in-vehicle devices 11, 12, 21, and 22 that has been transmitted from the server 100. Control of downloading is not limited to executing downloading alone, and may include a series of control of processing relating to downloading, such as determination regarding whether to execute downloading, verification of update data, and so forth. Installing is processing of writing update-version software (updating software) in the second storage unit of the in-vehicle device that is the target of updating, based on the downloaded update data. Control of installing is not limited to executing installing alone, and may include a series of processing relating to installing, such as determination regarding whether to execute installing, transfer of update data, verification of update-version software, and so forth. Activating is processing of enabling (activating) the installed update-version software. Control of activating is not limited to executing activating alone, and may include a series of control relating to activating, such as determination regarding whether to execute activating, verification of activation results, and so forth.

In control of installing, the control unit 53 can transmit the updating software to the in-vehicle device when the update data includes the updating software itself. Also, when the update data includes compressed data, difference data, or divided data of the updating software, the control unit 53 can perform unpacking, assembling, or the like, of the update data, thereby generating the updating software, and transmit the updating software to the in-vehicle device. Alternatively, the control unit 53 may transmit the update data to the in-vehicle device, and the in-vehicle device may perform unpacking, assembling, or the like, of the update data, and generate the updating software.

The control unit 53 may execute installation itself of writing the updating software to the second storage unit of the in-vehicle device, the in-vehicle device may perform this under instruction of the control unit 53, or the in-vehicle device that has received the update data (or the updating software) may autonomously perform this without explicit instruction of the control unit 53.

The control unit 53 may execute activation itself of enabling the installed updating software, the in-vehicle device may perform this under instruction of the control unit 53, or the in-vehicle device may autonomously perform this following installation, without explicit instruction of the control unit 53.

Note that such updating processing of software can be performed successively, or in parallel, to each of the in-vehicle devices. Also note that update data is data used for generating updating software, and includes, for example, the updating software itself, difference data for generating the updating software, compressed data or divided data thereof, or the like, as described above, and the content and the format thereof are not limited. The update data may also include an identifier of the in-vehicle device (ECU ID) that is the target of software updating (target ECU) and the identifier of the version of software prior to updating (ECU Software ID).

The server 100 is in one example a computer device, such as a server or the like installed in a particular center or the like, and is capable of transmitting respective update data to each of a plurality of vehicles, for updating software of in-vehicle devices of the vehicles. The server 100 includes a communication unit (communication module) 111 for communicating with the software updating device 50 and a control unit 112 for controlling the communication unit 111. The functions of the control unit 112 are executed by one or more processors, one or more microcontrollers, or the like. The server 100 is provided with a storage unit that is omitted from illustration, and is also capable of externally accepting and storing data for updating software for each of the in-vehicle devices.

Processing

An example of software updating processing according to the present embodiment will be described below. FIG. 2 is a sequence diagram showing an example of this processing. This processing is typically started in a state in which the power of the vehicle is on (ignition on, power on). Specifically, this processing may be stared at a timing when the power of the vehicle is turned on.

Step S101

The control unit 53 of the software updating device 50 controls the communication unit 51 to query the server 100 regarding whether there is updating software.

Step S102

Upon the communication unit 111 of the server 100 receiving the query, when there is updating software, the control unit 112 controls the communication unit 111 to transmit an update notification to the software updating device 50. The control unit 112 is capable of determining, based on information representing types of the in-vehicle devices included in the network system 1 and current software versions, for example, whether there is updating software, which is an update version, of such software for these in-vehicle devices. The server 100 may store such information in advance, or may receive the information at the time of the query from the software updating device 50. Note that when there is no updating software, the control unit 112 controls the communication unit 111 to transmit a no-update notification to the software updating device 50.

Step S103

Upon the communication unit 51 of the software updating device 50 receiving an update notification, the control unit 53 displays a prompt on a human-machine interface (HMI) device, which is one of the in-vehicle devices, for permission to download the update data. When the user performs an operation for permission on the HMI device, the control unit 53 controls the communication unit 51 to transmit an update data request and usage information to the server 100.

Usage information is information representing the usage state of the vehicle. Usage information includes, for example, the time when the vehicle was used in a plurality of times of the past, or average time thereof, and so forth, although not limited to this. The time when the vehicle was used is, for example, the time period that is from when the ignition is turned on until when the ignition is turned off and in which the vehicle travels and stops. The usage information may include information representing the frequency of usage of a plurality of functions of the vehicle, for example. The frequency of usage of the functions of the vehicle is the number of times or the like of user operations or the like enabling the functions making up advanced driver-assistance systems (ADAS), such as lane centering, cruise control, automated braking, proximity warning, and so forth, during a predetermined number of times of traveling in the past, for example. Further, usage information may include information generated based on a traveling plan set to the vehicle. A traveling plan is a traveling route to a destination that is currently set to an automotive navigation system, which is one of the in-vehicle devices, for example, and the usage information is estimated required time to reach the destination calculated based on the traveling plan, for example. The control unit 53 may acquire usage information generated by the in-vehicle devices, or may generate usage information from information such as logs, traveling plans, and so forth, acquired from the in-vehicle devices.

Step S104

Upon the communication unit 111 of the server 100 receiving the update data request and the usage information, the control unit 112 of the server 100 generates update data. The update data includes data for updating the software of one or more in-vehicle devices (target ECUs) that are the target of software updating.

The control unit 112 determines at least one of timing and speed of transmission of update data to the vehicle, based on usage information received from the vehicle. When the usage information includes usage time, and indicates that the usage time of the vehicle tends to be relatively short, the control unit 112 sets the communication speed as to the vehicle to be relatively fast as compared with when the usage information indicates that the usage time tends to be relatively long, for example. Relatively short usage time of the vehicle may be determined from the average, mode, or median of the usage time of the vehicle being smaller than a certain value, or may be determined from the usage time of the vehicle being smaller than the average, mode, or median of usage time derived from usage information received from another vehicle within a certain period in the past, for example.

Alternatively, the usage information may include information generated based on a traveling plan set in the vehicle, for example, and when the information indicates that the usage time of the current traveling is expected to be relatively short, the control unit 112 may make the communication speed as to the vehicle to be relatively fast as compared to when the usage time of the current traveling is expected to be relatively long. Expected usage time of the vehicle being relatively short may be determined from the expected usage time being smaller than a certain value, or may be determined from the expected usage time being smaller than the average of usage time derived from usage information received from another vehicle within a certain period in the past, for example.

Alternatively, when the usage information includes information representing the usage frequency of the functions of the vehicle, for example, the control unit 112 may determine update data for software relating to functions of which the usage frequency is relatively high to be transmitted to the vehicle before update data for software relating to functions of which the usage frequency is relatively low, based on the usage information. Note that the control unit 112 references information correlating a function and software for realizing that function or information correlating the function and an in-vehicle device for realizing the function, for example, in order to identify software corresponding to each of the functions. The server 100 may receive this information from the vehicle as part of the usage information, or as information separate from the usage information, or this information may be stored in the server 100 in advance.

Step S105

The control unit 112 of the server 100 controls the communication unit 111 to transmit the update data at the speed and the timing determined in step S104.

Step S106

Upon the communication unit 51 of the software updating device 50 receiving the update data, the control unit 53 stores the update data in the first storage unit 52 (download).

Step S107

Upon the communication unit 51 of the software updating device 50 receiving an update notification, the control unit 53 of the software updating device 50 displays a prompt on the HMI device for permission to perform installation and so forth. When the user performs an operation for permission on the HMI device, processing of installation, or installation and activation, is started. As one example here, the in-vehicle device 11 is included in the in-vehicle devices that are the target of software updating, and the control unit 53 transmits data for updating the software of the in-vehicle device 11 that is included in the update data received from the server 100 to the in-vehicle device 11.

Step S108

Upon receiving the data, the in-vehicle device 11 updates the software based on the received data. That is to say, when the in-vehicle device 11 is a type that performs overwrite installation, the in-vehicle device 11 performs the above-described overwrite installation. Also, when the in-vehicle device 11 is a type that performs the above-described other-bank installation, the in-vehicle device 11 performs the above-described other-bank installation and activation, in that order.

Step S109

When the data for updating the software of the in-vehicle devices included in the update data received from the server 100 includes that for an in-vehicle device that is the target of updating but has not been transmitted thereto, the control unit 53 of the software updating device 50 controls the communication unit 51 to transmit the above data to the in-vehicle device that is the target of updating. As one example here, the in-vehicle device 12 is included in the in-vehicle devices that are the target of updating software, and the control unit 53 transmits data for updating the software of the in-vehicle device 12 to the in-vehicle device 12.

Step S110

Upon receiving the data, the in-vehicle device 12 performs overwrite-installation or other-bank installation and activation of the software based on the received data, in the same way as the in-vehicle device 11 in step S108.

Although the above example is an example regarding when the update data received from the server 100 includes data for updating software for the in-vehicle devices 11 and 12, updating of software of other in-vehicle devices can be performed in the same way. Also, the number of in-vehicle devices that are the target of updating is not limited to two, and may be one, or three or more. Also, the data transmitted from the software updating device 50 to the in-vehicle devices in steps S107 and S109 may substantively be the updating software itself, as described above, or may be compressed data thereof, or difference data as to the software before updating, or the like.

Downloading typically is started after receiving user permission at the time of the user entering the vehicle and starting usage of the vehicle. Downloading can be executed even while the vehicle is traveling. However, overwrite-installation and activation are typically performed in a state with the power of the vehicle off (ignition off, power off) following the user permitting installation in step S107, since functions of the in-vehicle devices are restricted during installation and activation, and may negatively affect operations of the vehicle. Downloading is completed before the vehicle reaches the destination, since installation and activation can be executed immediately after the user exits the vehicle, and software can be updated without delay. However, when downloading is not completed before the vehicle reaches the destination, the download is interrupted by the power being turned off, for example, and is resumed when traveling the next time. Alternatively, an arrangement may be made in which the download is not interrupted by the power being turned off and is continued, but installation and activation cannot be executed until the user gives permission when traveling the next time, and turns the power off. Thus, when downloading is not completed before the vehicle reaches the destination, updating of the software is delayed.

Advantages

When past usage history indicates a tendency for usage time of the vehicle to be relatively short, the communication speed as to the vehicle is made to be relatively fast, as compared to when a tendency for a relatively long usage time is indicated. Thus, even when the usage time of the vehicle is relatively short, the probability of downloading being completed within the usage time, and being able to perform installation and activation immediately thereafter, can be raised. Also, when a relatively short usage time for the vehicle currently traveling is expected based on a traveling route, the communication speed as to the vehicle is made to be relatively fast, as compared to when a relatively long usage time is expected. Thus, even when the usage time of the vehicle currently traveling is relatively short, the probability of downloading being completed within the usage time, and being able to perform installation and activation immediately thereafter, can be raised. Also, by transmitting update data for software relating to functions of which the usage frequency is relatively high to the vehicle before transmitting update data for software relating to functions of which the usage frequency is relatively low, the probability of downloading update data for software being completed within the usage time, and being able to perform installation and activation immediately thereafter can be raised for at least the functions of which the usage frequency is high. Note that these may be combined. For example, when past history indicates a tendency for usage time of the vehicle to be relatively short, and furthermore a relatively short usage time for the vehicle currently traveling is expected based on the traveling route, the communication speed can be made to be faster as compared to when only one of these two is true. Also, update data for software relating to functions of which the usage frequency is relatively high may be transmitted at a relatively faster speed as compared to update data for software relating to functions of which the usage frequency is relatively low.

Thus, according to the present embodiment, at least one of the timing and the communication speed of transmitting update data for updating software is controlled in accordance with the usage state of the vehicle, and accordingly delay of updating software can be suppressed. Also, bandwidth overwhelming and increased loads can be suppressed more readily than uniformly increasing communication speed.

The present disclosure is not limited to a server, and can be understood as being a software updating device, a network system including the software updating device, a system including the software updating device and the server, a method executed by computers that each of the server and the software updating device include, a program and a computer-readable non-transitory storage medium storing the program, a vehicle provided with the software updating device, and so forth.

The present disclosure is useful in a network system installed in a vehicle or the like.

What is claimed is:

1. A control method executed by a computer of a server configured to transmit, to a vehicle, update data used in updating software of an in-vehicle device of the vehicle, the control method comprising:
   receiving usage information representing a usage state of the vehicle; and
   controlling, based on the usage information, a communication speed of communication between the vehicle and the server in transmitting the update data to the vehicle, wherein the controlling includes determining, based on the usage information, that a usage time is less than a threshold; and
   controlling the communication speed such that, based on the determination that the usage information indicates that the usage time is less than the threshold, the communication speed with respect to the vehicle is made to be faster than when the usage information indicates that the usage time is not less than the threshold.

2. A non-transitory storage medium storing a control program that is executable by the computer of the server configured to transmit, to the vehicle, the update data used in updating the software of the in-vehicle device of the vehicle, and that causes the computer to execute the control method according to claim 1.

3. A server configured to transmit update data used in updating software of an in-vehicle device of a vehicle to the vehicle, the server comprising:
   a communication module configured to:
      receive usage information representing a usage state of the vehicle; and
      transmit the update data to the vehicle; and
   one or more processors configured to control, based on the usage information, a communication speed of communication between the vehicle and the server in transmitting the update data to the vehicle by the communication module, wherein
   the one or more processors are configured to control the communication speed such that, when the usage information indicates that a usage time is less than a threshold, the communication speed with respect to the vehicle is made to be faster than when the usage information indicates that the usage time is not less than the threshold.

4. The server according to claim 3, wherein:
   the usage information further includes information representing usage frequency of functions of the vehicle; and
   the one or more processors are configured to transmit, based on the usage information, update data of software relating to a first function to the vehicle before transmitting update data of software relating to a second function, the first function having a usage frequency that is higher than a usage frequency of the second function.

5. A software updating device installed in a vehicle, the software updating device comprising:
   one or more processors configured to acquire or generate usage information representing a usage state of the vehicle; and
   a communication module configured to:
      transmit the usage information to a server; and
      receive, from the server, update data used in updating software of an in-vehicle device of the vehicle, at a communication speed of communication between the vehicle and the server, the communication speed being based on the usage information, wherein
   the one or more processors are configured to control the communication speed such that, when the usage information indicates that a usage time is less than a threshold, the communication speed with respect to the vehicle is made to be faster than when the usage information indicates that the usage time is not less than the threshold.

6. A vehicle comprising:
   the software updating device according to claim 5.

7. A software updating system comprising:
   a software updating device configured to transmit usage information representing a usage state of a vehicle; and
   a server configured to:
      receive the usage information from the software updating device;
      control, based on the usage information, a communication speed of communication between the vehicle and the server in transmitting update data used in updating software of an in-vehicle device of the vehicle, wherein
      the server is configured to control the communication speed such that, when the usage information indicates that a usage time is less than a threshold, the communication speed with respect to the vehicle is made to be faster than when the usage information indicates that the usage time is not less than the threshold; and
      transmit the update data to the software updating device.

* * * * *